United States Patent [19]

Rollins

[11] Patent Number: 5,076,010

[45] Date of Patent: Dec. 31, 1991

[54] AUTOMATIC PLANT WATERER

[76] Inventor: J. Frank Rollins, 807 Patricia La., Oxford, Ala. 36203

[21] Appl. No.: 425,290

[22] Filed: Oct. 23, 1989

[51] Int. Cl.$^5$ .............................................. A01G 31/00
[52] U.S. Cl. ........................................ 47/62; 47/79; 47/81
[58] Field of Search ............................... 47/62, 79, 81

[56] References Cited

U.S. PATENT DOCUMENTS

| 2,336,755 | 12/1943 | Sejarto | 47/62 |
| 2,691,245 | 10/1954 | Yohe | 47/81 |
| 3,250,606 | 5/1966 | Murray | 77/62 |

FOREIGN PATENT DOCUMENTS

| 0235953 | 8/1987 | European Pat. Off. | 47/62 |
| 0023731 | 2/1983 | Japan | 47/81 |
| 1556580 | 11/1979 | United Kingdom | 47/81 |

*Primary Examiner*—David A. Scherbel
*Attorney, Agent, or Firm*—Michael I. Kroll

[57] ABSTRACT

An automatic plant waterer is disclosed. The waterer includes a left planter portion, a right planter portion, and a float arrangement disposed intermediate the left planter portion and the right planter portion so that supplying water to the left planter portion and the right planter portion is automatic.

1 Claim, 2 Drawing Sheets

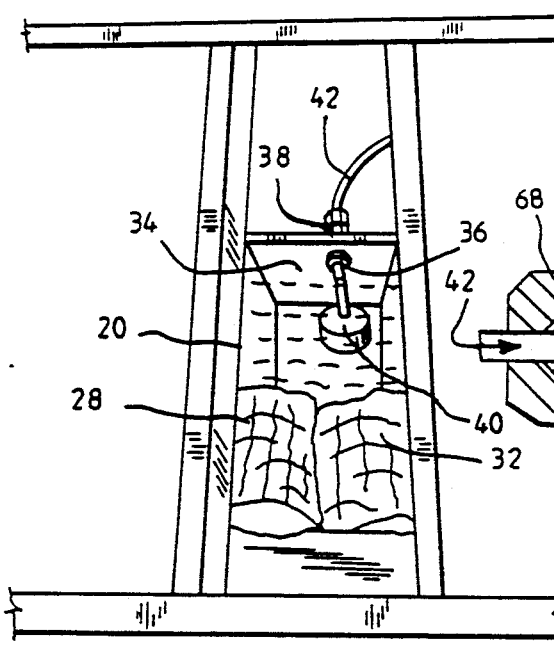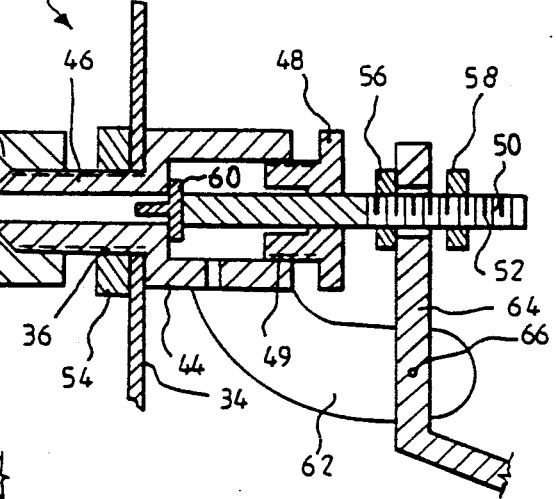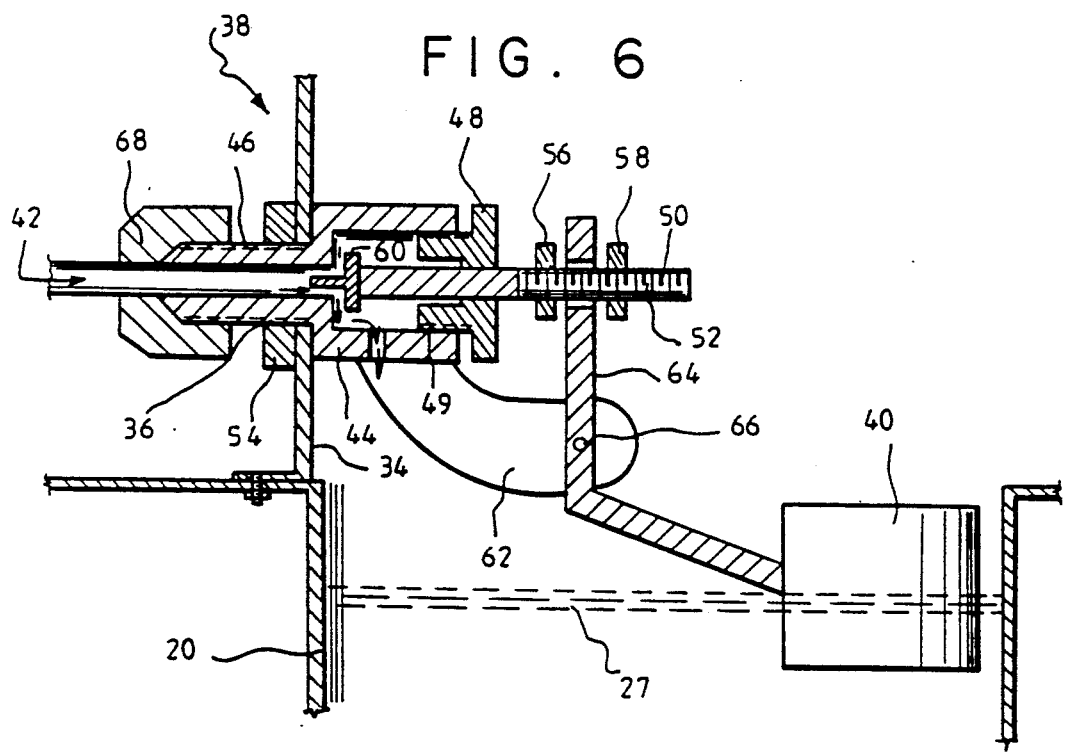

AUTOMATIC PLANT WATERER

BACKGROUND OF THE INVENTION

1. Field of the Invention

The present invention relates to a plant waterer.

More particularly, the present invention relates to a plant waterer that is automatic.

2. Description of the Prior Art

Numerous innovations for plant waterers have been provided in the prior art that are adapted to be used. Even though these innovations may be suitable for the specific individual purposes to which they address, they would not be suitable for the purposes of the present invention as heretofore described.

SUMMARY OF THE INVENTION

Accordingly, it is an object of the present invention to provide an automatic plant waterer that avoids the disadvantages of the prior art.

More particularly, it is an object of the present invention to enjoy household plants without the bother of daily watering; it allows worry free vacations for plant lovers; gives more free leisure time for the working housewife; it never allows an expensive plant to die because of lack of water; and it also allows one to have a much larger planting than ever before.

In keeping with these objects, and with others which will become apparent hereinafter, one feature of the present invention resides, briefly stated, in an automatic plant waterer, that has a left planter portion, a right planter portion, wherein means are disposed intermediate the left planter portion and the right planter portion.

When the automatic plant waterer is designed in accordance with the present invention, supplying water to the left planter portion and the right planter portion is done automatically.

In accordance with another feature of the present invention, means include a central water feed portion disposed intermediate the left planter portion and the right planter portion.

Another feature of the present invention is that the central water feed portion includes a water pan that is located substantially below the left planter portion and the right planter portion.

Yet another feature of the present invention is that it further comprises a left absorption pad and a right absorption pad that are disposed in the left and right planter portions, respectfully.

Still another feature of the present invention is that the right and left absorption pads each have a wick hanging in the water pan so that the wicks will absorb the Water and, by capillary action, distribute it to the left and right absorption pads, respectively.

Yet still another feature of the present invention is that it further comprises a water float valve disposed in the central water feed portion so that the water pan is always sufficiently filled with water.

The novel features which are considered characteristic for the invention are set forth in particular in the appended claims. The invention itself, however, both as to its construction and its method of operation, together with additional objects and advantages thereof, will be best understood from the following description of the specific embodiments when read in connection with the accompanying drawing.

BRIEF DESCRIPTION OF THE DRAWING

FIG. 4 is a plan perspective view of the watering compartment of the automatic plant waterer of the present invention;

FIG. 5 is a cross-sectional view of the water valving of the automatic plant waterer of the present invention, shown in the closed position; and FIG. 6 is a cross-sectional view of the water valving of the present invention, shown in the opened position.

LIST OF REFERENCE NUMERALS UTILIZED IN THE DRAWING

Figure 1:
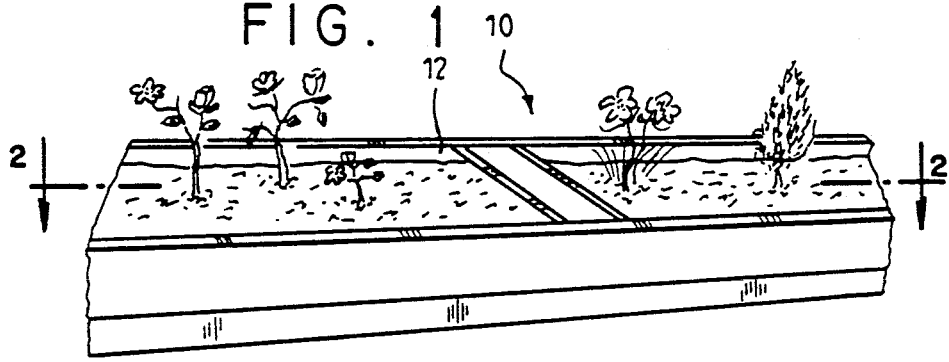
FIG. 1 is a front perspective view of the automatic plant waterer of the present invention.

10 - automatic plant waterer
12 - modified planter
14 - left portion of the automatic plant waterer 10
16 - central portion of the automatic plant waterer 10
18 - right portion of the automatic plant waterer 10
20 - dropped water pan of the central portion 16
22 - bottom of the left portion of the automatic plant waterer 10
24 - bottom of the right portion of the automatic plant waterer 10
26 - 2" quilted absorption pad
27 - water in the water pan 20
28 - 2" quilted absorption pad used as a wick that is continuous with the pad 26 and hangs in the water 27 in the water pan 20
30 - another 2" quilted absorption pad
32 - another 2" quilted absorption pad used as a wick that is continuous with the pad 30 and hangs in the water 27 in the water pan 20
34 - water valve mount bracket
36 - bore contained in the water valve mount bracket
38 - water float valve
40 - float
42 - water supply line
44 - body portion
46 - male threaded extension
48 - tail cap
49 - treaded portion of the tail cap 48
50 - adjustment rod
52 - threaded portion of the adjustment rod 50
54 - lock nut
56 - adjustment wheel
58 - another adjustment wheel
60 - neoprene washer, seal, plunger, and valve
62 - arm bracket
64 - arm
66 - pivot point
68 - flair nut

DETAILED DESCRIPTION OF THE PREFERRED EMBODIMENT

Referring now to FIG. 1, the automatic plant waterer of the present invention is shown generally at 10 and located in a modified planter 12.

Figure 2:
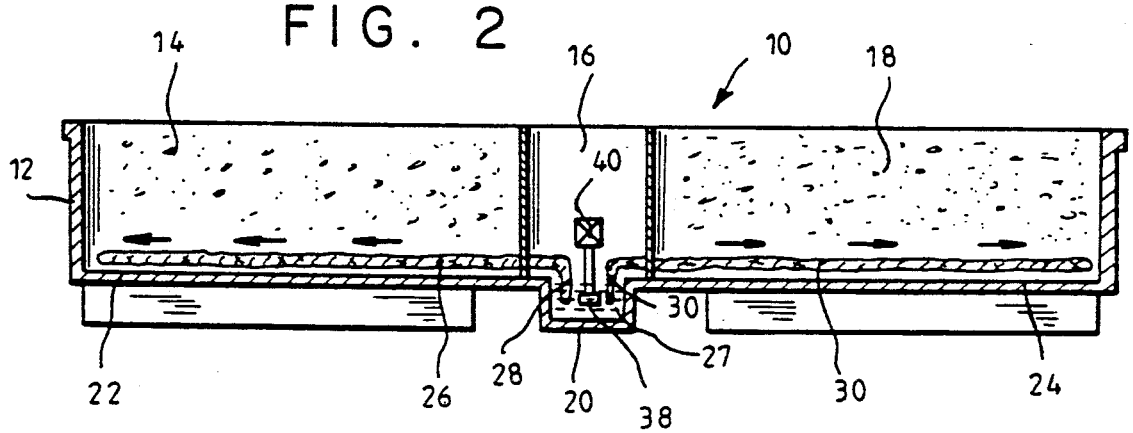
FIG. 2 is a cross-sectional side view of the automatic plant waterer of the present invention taken along line 2—2 in FIG. 1.
Figure 3:
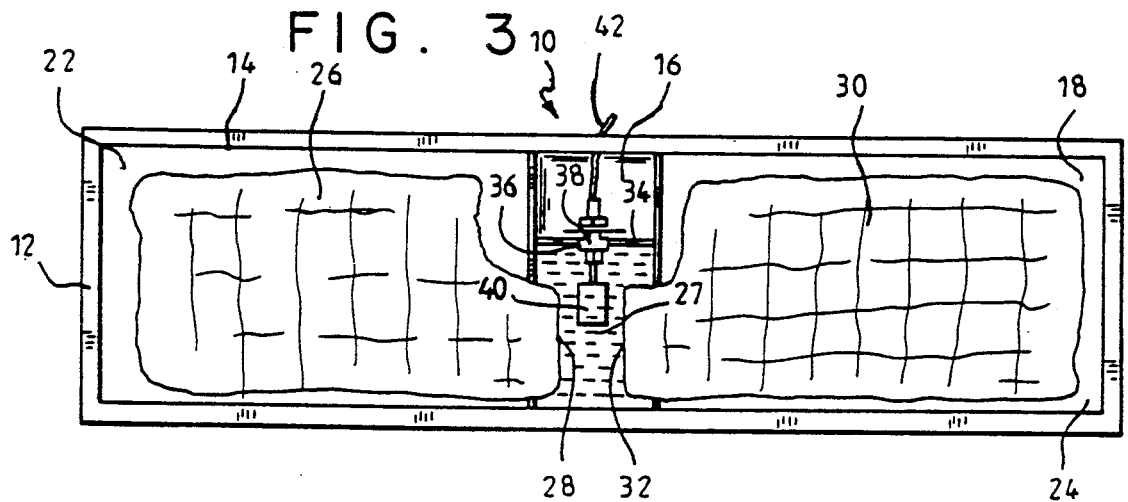
FIG. 3 is a plan view of the automatic plant waterer of the present invention.

As can be seen in FIGS. 2, 3, and 4 the automatic plant waterer 10 includes three portions. The left portion 14 is for the plants, the central portion 16 is for the water feed, and the right portion 18 is also for the plants. The central portion 16 includes a water pan 20 that is below the left portion 14 and the right portion 18. The water pan 20 maintains a water level that is substantially equal to the bottoms 22 and 24 of the left portion 14 and the right portion 18, respectively.

A 2" absorption pad 26 located on and substantially covering the bottom 22 of the left portion 14 includes a 2" absorption pad wick 28 that is continuous with the pad 26 and hangs in the water 27 in the water pan 20.

A 2" absorption pad 30 located on and substantially covering the bottom 24 of the left portion 14 includes a 2" absorption pad wick 32 that is continuous with the pad 30 and hangs in the water 27 in the water pan 20.

The central portion 16 further includes a water valve mount bracket 34 containing a bore 36. The bore 36 supports the water float valve 38 which is attached to the float 40. A ¼" water supply line 42 connects to the water float valve 38.

The details of the water float valve 38 can be seen in FIGS. 5 and 6.

The water float valve 38 includes a body portion 44 with a male threaded extension 46, a tail cap 48, an adjustment rod 50 with a threaded portion 52, a lock nut 54, a pair of adjustment wheels 56 and 58, a neoprene washer, seal, plunger, valve 60, an arm bracket 62, an arm 64, a pivot point 66, a water outlet 68, and a flair nut 67.

In operation, since the water pan 20 is initially empty, the float 40 would be low and in the to be tilled position.

However, during the filled position, the water float valve 38 is open allowing water 27 from the supply line 42 to enter and fill the water pan 20. At this point, the float is high and in the filled position and which causes the water float valve 38 to close.

As the water 27 in the water pan 20 becomes depleted by the wicks 28 and 32, the float 40 drops causing the water float valve 38 to open, which again allows water 27 from the supply line 42 to enter and fill the water pan 20. The adjustment wheels 56 and 58 regulate the float 40 for the proper depth opening and closing of the water float valve 38.

Since, the wicks 28 and 32 hang in the water 27 in the water pan 20, and due to capillary action, the water 27 in the water pan 20 is sucked up by the wicks 28 and 32 and distributed to the pads 26 and 30, respectively. The absorption pads 26 and 30 soak the soil placed on the top of the left and right absorption pads 26 and 30, respectively, so that the soil above the pads 26 and 30 is kept moist at all times, while the amount of moisture in the soil is controlled by the water level in the pan 20.

It will be understood that each of the elements described above, or two or more together, may also find a useful application in other types of constructions differing from the type described above.

While the invention has been illustrated and described as embodied in an automatic plant waterer, it is not intended to be limited to the details shown, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

I claim:

1. An automatic plant waterer, comprising:

a) a left planter portion having a bottom;

b) a right planter portion having a bottom; and c) means attached to and disposed intermediate to said left planter portion and said right planter portion so that supplying water to the left planter portion and the right planter portion is automatic, said means including a central water feed portion, said central water feed portion including a water pan that is below said left planter portion and below said right planter portion;

d) a left absorption pad and a right absorption pad and being disposed in the left and right planter portions, respectfully, said right and left absorption pads each having a wick hanging in the water pan so that said wicks will absorb the water and by capillary action distribute it to the left and right absorption pads, respectively, said left and right absorption pads are one layer each and substantially cover said bottoms of said right and left planters, respectively; and e) a water float valve being horizontally disposed in said central water feed portion so that said water pan is constantly and automatically refilled with water as it becomes necessary and said valve being not submerged so as to present water damage, said water float valve including a body portion with a bottom and a male threaded extension, a tail cap, an adjustment rod with a threaded portion and a nonthreaded portion, a lock nut, a pair of adjustment wheels, a neoprene washer, a seal, a plunger, an arm bracket, an arm, a pivot point, a water outlet and a flair nut, said lock nut and said flair nut fitting on said male threaded extension of said body portion, said plunger being attached to said nonthreaded portion of said adjustment rod, said plunger being within said body portion and said adjustment rod being slidably movable through said tail cap which is threaded to said main body, said threaded portion of said adjustment rod receiving said adjustment wheel and said arm and said other adjustment wheel, said arm being connected to said arm bracket at said pivot point, said plunger including said neoprene washer and said seal, said water outlet being disposed on said bottom of said main body.

* * * * *